(12) United States Patent
Sun et al.

(10) Patent No.: US 10,282,664 B2
(45) Date of Patent: May 7, 2019

(54) METHOD AND DEVICE FOR CONSTRUCTING EVENT KNOWLEDGE BASE

(71) Applicant: BAIDU ONLINE NETWORK TECHNOLOGY (BEIJING) CO., LTD., Beijing (CN)

(72) Inventors: Ke Sun, Beijing (CN); Shiqi Zhao, Beijing (CN); Zhou Xin, Beijing (CN); Haifeng Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 331 days.

(21) Appl. No.: 14/899,510

(22) PCT Filed: Oct. 31, 2014

(86) PCT No.: PCT/CN2014/090073
§ 371 (c)(1),
(2) Date: Dec. 17, 2015

(87) PCT Pub. No.: WO2015/103899
PCT Pub. Date: Jul. 16, 2015

(65) Prior Publication Data
US 2016/0314394 A1 Oct. 27, 2016

(30) Foreign Application Priority Data
Jan. 9, 2014 (CN) .......................... 2014 1 0010694

(51) Int. Cl.
*G06N 5/02* (2006.01)
*G06F 16/35* (2019.01)
*G06N 20/00* (2019.01)

(52) U.S. Cl.
CPC ............. *G06N 5/022* (2013.01); *G06F 16/35* (2019.01); *G06N 20/00* (2019.01)

(58) Field of Classification Search
USPC ......................................................... 706/61
See application file for complete search history.

(56) References Cited

U.S. PATENT DOCUMENTS 8,301,435 B2 * 10/2012 Sadamasa ........... G06F 17/2785
704/2
9,208,440 B2 * 12/2015 Morara .................... G06N 5/02
(Continued)

FOREIGN PATENT DOCUMENTS

CN 101937430 A 1/2011
CN 102117283 7/2011
(Continued)

OTHER PUBLICATIONS

Elsevier Procedia Computer Science vol. 29, 2014, pp. 478-487 ICCS 2014. 14th International Conference on Computational Science Mining Large-scale Event Knowledge from Web Text Ya-nan Cao, Peng Zhang, Jing Guo, Li Guo Institute of Information Engineering, Chinese Academy of Science, Beijing, China.*
(Continued)

Primary Examiner — Michael B Holmes
(74) Attorney, Agent, or Firm — Hodgson Russ LLP

(57) ABSTRACT

Proposed are a method and device for constructing an event knowledge. The method comprises: identifying text to obtain an event mining candidate sentence; dividing the event mining candidate sentence into syntax fragments; generating an event knowledge instance according to the syntax fragments and a preset event knowledge construction, in which the number of the event knowledge instances is equal to the number of verb-object fragments and subject-predicate fragments in the syntax fragments; obtaining an event mining target sentence according to the verb-object
(Continued)

fragments and the subject-predicate fragments in the syntax fragments, dividing the event mining target sentence, and writing divided members into an event knowledge instance correspondingly, so as to accomplish construction of the event knowledge base.

15 Claims, 3 Drawing Sheets

(56) References Cited

U.S. PATENT DOCUMENTS

| | | | |
|---|---|---|---|
| 9,665,875 B2* | 5/2017 | Subramanian | G06Q 30/0201 |
| 9,785,672 B2* | 10/2017 | Li | G06F 16/24532 |
| 10,055,453 B2* | 8/2018 | Zhao | G06F 16/2423 |
| 2002/0174083 A1 | 11/2002 | Hellerstein et al. | |
| 2004/0073548 A1 | 4/2004 | Lim | |
| 2009/0018821 A1* | 1/2009 | Sadamasa | G06F 17/2785 704/9 |
| 2013/0325784 A1* | 12/2013 | Morara | G06N 5/02 706/46 |
| 2015/0293927 A1* | 10/2015 | Wang | G06F 16/90328 707/706 |
| 2015/0293970 A1* | 10/2015 | Li | G06F 16/24532 707/722 |
| 2015/0339385 A1* | 11/2015 | Zhao | G06F 16/9535 707/706 |
| 2016/0012103 A1* | 1/2016 | Zhao | G06F 16/2423 707/722 |
| 2016/0125047 A1* | 5/2016 | Huang | G06F 16/9535 707/722 |
| 2016/0314394 A1* | 10/2016 | Sun | G06N 5/022 |
| 2016/0379121 A1* | 12/2016 | Ge | B25J 11/0005 706/46 |
| 2017/0249399 A1* | 8/2017 | Hu | G06F 16/00 |
| 2017/0308531 A1* | 10/2017 | Ma | G06N 5/022 |
| 2018/0357508 A1* | 12/2018 | Cui | G06K 9/629 |

FOREIGN PATENT DOCUMENTS

| | | |
|---|---|---|
| CN | 102207947 | 10/2011 |
| CN | 102207948 | 10/2011 |
| CN | 103049532 A | 4/2013 |
| CN | 103699689 | 4/2014 |
| JP | 2005115882 | 4/2005 |
| JP | 2007133905 | 5/2007 |
| JP | 2011123794 | 6/2011 |
| KR | 20130099327 | 9/2013 |

OTHER PUBLICATIONS

Knowledge Base Population: Successful Approaches and Challenges Heng Ji, Ralph Grishman Proceedings of the 49th Annual Meeting of the Association for Computational Linguistics, pp. 1148-1158, Portland, Oregon, Jun. 19-24, 2011. c 2011 Association for Computational Linguistics.*
Elsevier Knowledge-Based Systems vol. 69, Oct. 2014, pp. 78-85 Enriching semantic knowledge bases for opinion mining in big data applications A. Weichselbraun, S. Gindl, A. Scharl.*
IEEE Transactions on Knowledge and Data Engineering, vol. 7, No. 5, Oct. 1995 713 Acquisition of Linguistic Patterns for Knowledge-Based Information Extraction Jun-Tae Kim and Dan I. Moldovan, Member, IEEE pp. 713-724.*
ACM Digital Library Multiple Instance Learning Framework for Identifying Key Sentences and Detecting Events, Wei Wang, Yue Ning, Huzefa Rangwala, Naren Ramakrishnan CIKM '16 Proceedings of the 25th ACM International on Conference on Information and Knowledge Management pp. 509-518, Oct. 2016.*
Mining Paraphrases from Self-anchored Web Sentence Fragments, Marius Pasca, PKDD 2005, LNAI 3721, pp. 193-204, 2005.*
ACM Digital Library Question answering from the web using knowledge annotation and knowledge mining techniques, Jimmy Lin, Boris Katz Proceeding CIKM '03 Proceedings of the twelfth international conference on Information and knowledge management pp. 116-123 Nov. 3-8, 2003.*
ScienceDirect Elsevier Artificial Intelligence vol. 118, Issues 1-2, Apr. 2000, pp. 69-113 Learning to construct knowledge bases from the World Wide Web, Mark Craven, Dan DiPasquo, Dayne Freitag, Andrew McCallum, Tom Mitchell, Kamal Nigam, Seán Slattery.*
Suhara, Yoshihiko et al., Event Mining from Blogosphere using topic words, Information Processing Society of Japan, Nov. 23, 2006, pp. 67-73.

* cited by examiner

METHOD AND DEVICE FOR CONSTRUCTING EVENT KNOWLEDGE BASE

CROSS REFERENCE TO RELATED APPLICATION

This application is a national phase entry under 35 USC § 371 of International Application PCT/CN2014/090073, filed Oct. 31, 2014, which claims priority to and benefits of Chinese Patent Applications No. 201410010694.7, filed with the State Intellectual Property Office of P.R. China on Jan. 9, 2014, the entire contents of which are incorporated herein by reference.

FIELD

Embodiments of the present disclosure generally relate to the field of computer technology, and more particularly, to a method and a device for constructing an event knowledge base.

BACKGROUND

The search engine technology carries out a revolution around the knowledge graph. The core of the revolution turns to a new generation knowledge-based search oriented to structuralized knowledge from the traditional search oriented to un-structuralized webpage text, thus providing more accurate search results for the user and improving the user's search experience. At present, the core of the knowledge graph technology (the knowledge graph in a narrow sense) include the entity knowledge base (hereinafter referred to as the entity library) containing the entity knowledge and the related application technologies.

In the entity library, one piece of entity knowledge may consist of its unique semantic serial number i.e. a semantic identifier (ID), attributes with the clear semantic meaning and property values. For example, for the entity knowledge "BAIDU Co.", the entity library first gives a globally unique ID (assumed as company_XXX) as its unique semantic serial number, and adds semantic information based on categories which the entity belongs to, for example, "Founded: January 2000", "Business: Network Information Service", "Chairman: Li Yanhong", "subsidiaries: 91 Wireless (company_YYY), IQI (company_ZZZ)", etc. The above knowledge may solve the user's questions about factual knowledge, for example, "what are subsidiaries of BAIDU Co.?" or "who is the Chairman of BAIDU Co.?". It just needs to resolve the above questions to "{category=company; entity=BAIDU Co. (company_XXX); attribute=subsidiaries; attribute value=?}" and "{category=company; entity=BAIDU Co. (company_XXX); attribute=Chairman; attribute value=?}", such that the user's requirements may be satisfied by the existing knowledge graph.

However, since the entity knowledge is centered on an entity or a certain virtual entity, when describing relationships between entities, one of the most common methods is to abstract it into a specific attribute, for example, "Chairman", "subsidiaries", "Business", etc. Although such abstraction may make the representation of knowledge more refined, details may be lost.

Taking the in-depth ask-answer application as example—if the user asks "which subsidiaries are acquired by BAIDU Co. in 2013" or "how much does BAIDU Co. acquire 91 Wireless and internet TV software (PPS) totally", the above questions cannot be answered based on the knowledge of the traditional entity library.

Thus, when the in-depth knowledge search is performed based on the traditional entity library, no search results can be provided for the user, thereby reducing the user's search experience.

SUMMARY

The present disclosure seeks to solve at least one of the above problems.

Accordingly, a first objective of the present disclosure is to provide a method for constructing an event knowledge base. The method may construct the event knowledge base by a preset event knowledge construction, provide an accurate research result for the user based on the event knowledge base, and hence improve the user's search experience.

A second objective of the present disclosure is to provide a device for constructing an event knowledge base.

In order to realize the above objectives, embodiments of a first aspect of the present disclosure provide a method for constructing an event knowledge base, comprising: identifying text to obtain an event mining candidate sentence; dividing the event mining candidate sentence into syntax fragments; generating an event knowledge instance according to the syntax fragments and a preset event knowledge construction, wherein the number of the event knowledge instances is equal to the number of verb-object fragments and subject-predicate fragments in the syntax fragments; obtaining an event mining target sentence according to the verb-object fragments and the subject-predicate fragments in the syntax fragments, dividing the event mining target sentence, and writing divided members into an event knowledge instance correspondingly, so as to accomplish construction of the event knowledge base.

The method for constructing an event knowledge base according to embodiments of the present disclosure may construct the event knowledge base according to the preset event knowledge construction and the syntax fragments, and structuralize the webpage knowledge based on the event knowledge base and further support the inference and calculation between knowledge. In addition, the method may merge the related events, thus providing the accurate research results for the user when the user wants the in-depth knowledge search and further improving the user's search experience.

In order to realize the above objectives, embodiments of a second aspect of the present disclosure provide a device for constructing an event knowledge base, comprising: a processor; a memory configured to store an instruction executable by the processor; wherein the processor is configured to: identify text to obtain an event mining candidate sentence; divide the event mining candidate sentence identified by the identifying module into syntax fragments; generate an event knowledge instance according to the syntax fragments and a preset event knowledge construction, wherein the number of the event knowledge instances is equal to the number of verb-object fragments and subject-predicate fragments in the syntax fragments; and obtain an event mining target sentence according to the verb-object fragments and the subject-predicate fragments in the syntax fragments, divide the event mining target sentence, and write divided members into an event knowledge instance correspondingly, so as to accomplish construction of the event knowledge base.

The device for constructing an event knowledge base according to embodiments of the present disclosure may construct the event knowledge base according to the preset event knowledge construction and the syntax fragments, and structuralize the webpage knowledge based on the event knowledge base and further support the inference and calculation between knowledge. In addition, the method may merge the related events, thus providing the accurate research results for the user when the user wants the in-depth knowledge search and further improving the user's search experience.

In order to realize the above objectives, embodiments of a third aspect of the present disclosure provide a non-transitory computer-readable storage medium having stored therein instructions that, when executed by a processor of an electronic device, causes the electronic device to perform a method for constructing an event knowledge base according to embodiments of the first aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
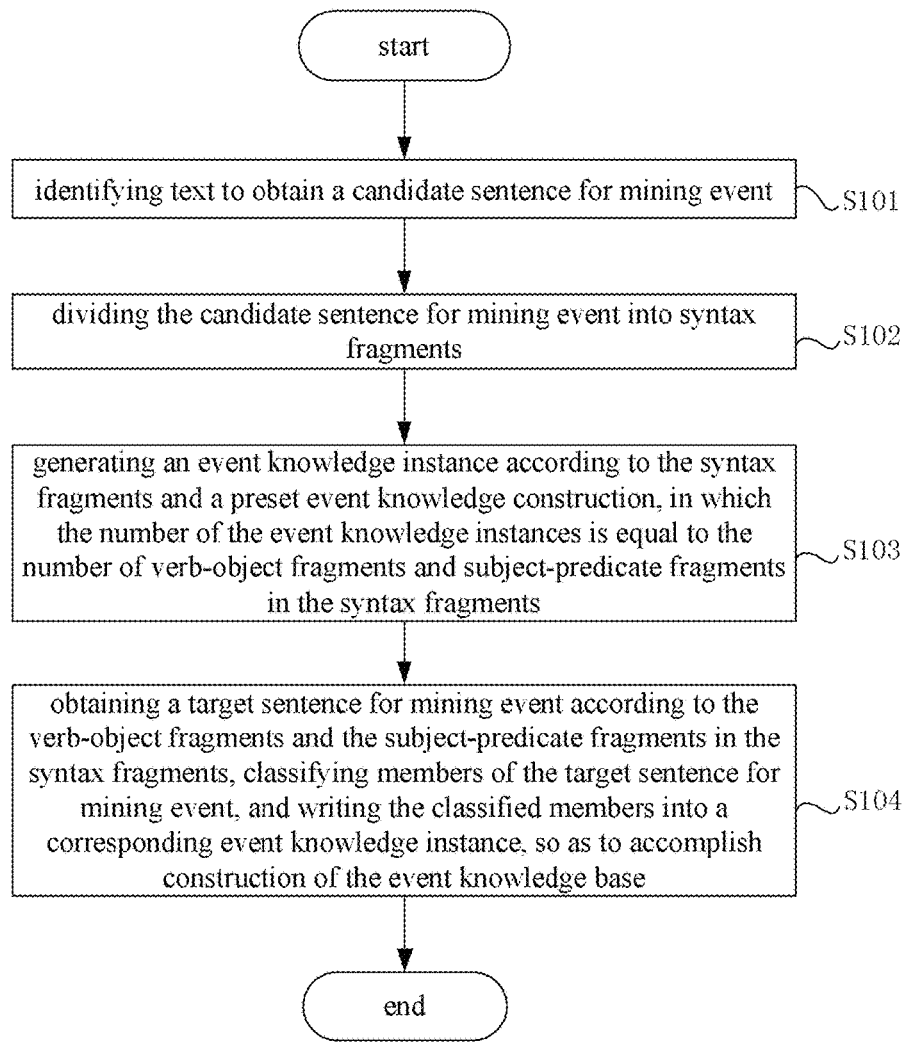
FIG. 1 is a flow chart showing a method for constructing an event knowledge base according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. In contrast, the present disclosure may include alternatives, modifications and equivalents within the spirit and scope of the appended claims.

In the description of the present disclosure, it should be understood that, unless specified or limited otherwise, terms such as "first" and "second" are used herein for purposes of description and are not intended to indicate or imply relative importance or significance. In the description of the present disclosure, it should be noted that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure. In addition, in the description of the present disclosure, "a plurality of" means two or more, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

In order to structuralize the webpage text knowledge and further support the inference and calculation between knowledge, embodiments of the present disclosure provide a method and a device for constructing an event knowledge base. In the following, the method and the device for constructing an event knowledge base according to embodiments of the present disclosure will be described with reference to drawings.

FIG. 1 is a flow chart showing a method for constructing an event knowledge base according to an embodiment of the present disclosure.

As shown in FIG. 1, the method for constructing an event knowledge base includes the following steps.

In S101, text is identified to obtain an event mining candidate sentence.

The target of mining event knowledge is the natural language text. In Internet resources, not all natural language sentences may eventually become the event knowledge. Therefore, firstly, the natural language text, for example, webpage text, may be identified to make out the event mining candidate sentence. In this embodiment, the event mining candidate sentence at least needs to contain one subject entity as well as the core motion of this subject entity.

If the event mining candidate sentence in this embodiment is that "91 Wireless Co., the subsidiary of Network Dragon Co., is the leading mobile Internet company in China, and in websites Sj.91.com and apk.hiapk.com, it develops and operates the mobile application distribution platform of two smartphone giants for iPhone operating system and Android operating system".

In S102, the event mining candidate sentence is divided into syntax fragments.

The syntax fragments include a subject-predicate fragment, a verb-object fragment, an adverbial fragment, a subject fragment and a nounal predicate fragment, etc.

For example, the event mining candidate sentence obtained in S101 is divided into the following fragments: the subject fragment: 91 Wireless CO.; the nounal predicate fragment: the subsidiary of Network Dragon Co.; the adverbial fragment: in websites Sj.91.com and apk.hiapk.com; the verb-object fragment: is the leading mobile internet company in China; the subject-predicate fragment: it develops and operates the mobile application distribution platform of two smartphone giants for iPhone operating system and Android operating system.

In S103, an event knowledge instance is generated according to the syntax fragments and a preset event knowledge construction, in which the number of the event knowledge instances is equal to the number of verb-object fragments and subject-predicate fragments in the syntax fragments.

In an embodiment of the present disclosure, the preset event knowledge construction has four attributes: an identifier of event knowledge instance, a subject entity, an object entity and an action; the subject entity includes entity information and embellishment information corresponding to an action initiator; the object entity includes entity information and embellishment information corresponding to an action bearer; the action includes a core action and constraint information, in which:

(a) The identifier of event knowledge instance is the unique independent identifier of event knowledge instance, mainly allocated by the event knowledge base and stored in event ID attribute. A single event knowledge instance has one and only one ID.

(b) The subject entity identifies the action initiator of the event (the subject in the passive sentence also is the action initiator); its "entity" attribute domain stores the entity name and the entity semantic ID and its modification attribute domain (one entity may include multiple modification attributes) stores the modifier and determiner of the entity; in the single event knowledge, one subject entity attribute is needed at least; the subject entity may be plural; certainly, the information stored in the above modification attribute domain is the modification information.

(c) The object entity identifies the action bearer of the event; its entity attribute domain stores the entity name and the entity semantic ID; in addition to the entity words, quantifier (e.g., 10.39% of shares), time (date, hour/minute/second), a period of time (e.g., XX day to YY day, AA hour to BB hour), resource (e.g., url, uri, etc.), telephone/postcode, location/direction (e.g., dining hall, the south), tool/material (e.g., wool, wages), comparison (e.g., one to two), means (e.g., surgery, low pitch), enumeration word (e.g., constellations, blood types), common noun (e.g., mobile application distribution platform), etc. may also serve as the object entity; its modification attribute domain stores the modifier and determiner of the object entity; in the single event knowledge, the subject entity may be missing, for example, Jobs' death; certainly, the information stored in the above modification attribute domain being the embellishment information.

(d) Action identifies the behavior of the subject entity in the event; "the core action" identifies the behavior of the subject entity and the single event knowledge has one and only one core action attribute (parallel actions may exist, for example, "develop and operate"); the constraint attribute is configured to embellish the core action and there may be two or more constraint attributes; the constraint attribute may be identified with the specific attribute type (e.g., time, price, status, direction, etc.) and the type (e.g., quantifier type, entity type) may be assigned for the attribute value of the constraint attribute.

Specifically, the event knowledge instance is generated according to the number of the verb-object fragments and the subject-predicate fragments in term of the preset event knowledge construction, i.e. each of the verb-object fragments and the subject-predicate fragments corresponding to one event knowledge instance. For example, both the verb-object fragment and the subject-predicate fragment exist in the syntax fragments obtained in step S102, so two event knowledge instances need to be prepared, namely event_1 and event_2 shown in Table 1. At the same time, all syntax fragments except the verb-object fragment and the subject-predicate fragment are classified into the embellishment and constraint components of the verb-object fragment and the subject-predicate fragment.

TABLE 1 the event knowledge base containing the event knowledge instances

| attribute type | attribute | value | |
|---|---|---|---|
| ID | event ID | event_1 | event_2 |
| subject entity | entity | — | — |
|  | embellishment | — | — |
| object entity | entity | — | — |
|  | embellishment | — | — |
| action | core action | — | — |
|  | constraint | — | — |

In S104, an event mining target sentence is obtained according to the verb-object fragments and the subject-predicate fragments in the syntax fragments, the event mining target sentence are divided, and divided members are correspondingly written into an event knowledge instance, so as to accomplish construction of the event knowledge base.

Specifically, step S104 may include: firstly the subject-predicate fragment in the event mining target sentence are divided, and all divided members are written into the subject entity, the object entity and the action of the event knowledge sentence; the subject fragment is written into the subject entity of the event knowledge sentence, the verb-object fragment are divided and all divided members are written into the object entity and the action of the event knowledge sentence, if the subject fragment exists in the verb-object fragment in the event mining target sentence; and syntax fragments in the event mining target sentence except the subject-predicate fragment and the verb-object fragment are divided, and all divided members are written into the embellishment information and the constraint information of the event knowledge sentence, in which the members includes one or more of a subject, a predicate, an object, a subject attributive, an adverbial and an object attributive.

In this embodiment, the event mining target sentences obtained according to the verb-object fragment and the subject-predicate fragment in the syntax fragments may be as follows.

The event mining target sentence event_1: 91 Wireless CO., the subsidiary of Network Dragon Co., is the leading mobile internet company in China.

The event mining target sentence event_2: in website Sj.91.com and apk.hiapk.com, it develops and operates the mobile application distribution platform of two smartphone giants for iPhone operating system and Android operating system.

After obtaining the corresponding event mining target sentences, the mining may be performed around the verb. That is, the subject-predicate fragments and the verb-object fragments in the event mining target sentences may be divided firstly, and then other fragments may be divided.

In this embodiment, firstly, the subject-predicate fragments of the event mining target sentence event_2 may be divided to obtain the subject, the subject attributive, the predicate core verb, the adverbial, the object and the object attributive, and these members are respectively written into the subject entity, the object entity and the action of the event knowledge instance.

For example, "it develops and operates the mobile application distribution platform of two smartphone giants for iPhone operating system and Android operating system" may be divided as follows: the subject: it; the adverbial:

iPhone operating system and Android operating system; the verb: develop and operate; the object: the mobile application distribution platform of two smartphone giants. Then the divided members may be written into the event knowledge instances of the event knowledge base shown in Table 1 and the resulting event knowledge base may be shown in Table 2.

TABLE 2 the event knowledge base after writing the subject-predicate fragment

| attribute type | attribute | value | |
|---|---|---|---|
| ID | event ID | event_1 | event_2 |
| subject entity | entity | — | it |
| | embellishment | — | — |
| object entity | entity | — | mobile application distribution platform of two smartphone giants |
| | embellishment | — | — |
| action | core action | — | develop and operate |
| | constraint | — | iPhone operating system and Android operating system |

Then, the verb-object fragment of the event mining target sentence event_1 may be divided. Firstly, it is determined whether the subject fragment exists in this whole sentence. If the subject fragment exists, the subject fragment will be written into the subject entity of the event knowledge instance. Then, the dependency syntax mining may be adopted to find out the verb, the adverbial, the object, the object attributive and other members in the verb-object fragment, and these members are respectively written into the object entity and the action of the corresponding event knowledge instances. If the subject fragment does not exist, this fragment to be mined is discarded.

For example, "is the leading mobile internet company in China" may be divided as follows: the verb: is; the object: mobile internet company; the object attributive: leading in China The divided members may be written into the event knowledge instances of the event knowledge base shown in Table 2 and the resulting event knowledge base may be shown in Table 3.

TABLE 3 the event knowledge base after writing the verb-object fragment

| attribute type | attribute | value | |
|---|---|---|---|
| ID | event ID | event_1 | event_2 |
| subject entity | entity | 91 Wireless | it |
| | embellishment | — | — |
| object entity | entity | mobile internet company | mobile application distribution platform of two smartphone giants |
| | embellishment | leading in China | — |
| action | core action | is | develop and operate |
| | constraint | — | iPhone operating system and Android operating system |

Finally, other embellishment components may be added. For example, the adverbial fragment of the event mining target sentence event_2 as the constraint of the closest core action at the right side is added into the event knowledge instance. For example, the adverbial fragment "in websites Sj.91.com and apk.hiapk.com" is added into the event knowledge instance, as shown in Table 4.

TABLE 4 the event knowledge base after writing the adverbial fragment

| attribute type | attribute | value | |
|---|---|---|---|
| ID | event ID | event_1 | event_2 |
| subject entity | entity | 91 Wireless | it |
| | embellishment | — | — |
| object entity | entity | mobile internet company | mobile application distribution platform of two smartphone giants |
| | embellishment | leading in China | — |
| action | core action | is | develop and operate |
| | constraint | — | iPhone operating system and Android operating system |
| | constraint | — | sj.91.com apk.hiapk.com |

Then, the nounal predicate fragment is added into the event knowledge instance of the event knowledge base. Specifically, firstly, it is judged whether the subject fragment exists in this whole sentence. If the subject fragment exists, it will be added into the embellishment of the subject entity of the event knowledge instance. If the subject fragment does not exist, the current fragment is discarded. For example, the nounal predicate fragment "the subsidiary of Network Dragon Co." is added into the event knowledge instance, as shown in Table 5.

TABLE 5 the event knowledge base after writing the nounal predicate fragment

| attribute type | attribute | value | |
|---|---|---|---|
| ID | event ID | event_1 | event_2 |
| subject entity | entity | 91 Wireless | it |
| | embellishment | the subsidiary of Network Dragon Co. | — |
| object entity | entity | mobile internet company | mobile application distribution platform of two smartphone giants |
| | embellishment | leading in China | — |
| action | core action | is | develop and operate |
| | constraint | — | iPhone operating system and Android operating system |
| | constraint | — | sj.91.com apk.hiapk.com |

The part marked by bold fonts is newly added in the current table. The dynamic construction procedure of the event knowledge base may be seen from Tables 1 to 5.

It can be seen that, embodiments of the present disclosure collect and fill the event knowledge base with the preset structure by fragmentation from the sentences in the webpage text, so as to collect the event knowledge instances. However, for a complete event, the information of the single event may be one-sided. With three event knowledge instances in Table 6 as an example, these three event knowledge instances describe one event that "BAIDU Co. acquires Network Dragon Co." from different aspects in different word orders. However, the information obtained by only one event knowledge instance is one-sided.

TABLE 6 the event knowledge base after writing three event knowledge instances

| attribute type | attribute | value | | |
|---|---|---|---|---|
| ID | event ID | event_1 | event_2 | event_3 |
| subject entity | entity | BAIDU Co. (company_XXX) | BAIDU Co. (company_XXX) | 91 Wireless |
| | embellishment | Chinese search engine giant | — | |
| object entity | entity | 91 Wireless (company_YYY) | 91 Wireless (company_YYY) | BAIDU Co. (company_XXX) |
| | embellishment | the subsidiary of Network Dragon Co. | — | |
| action | core action | acquire | merger | acquired |
| | constraint | (time) July 2013 | (price) 1.9 billion (USD) | (means) by shares |

In order to ensure that it is possible to collect information about an event in the event knowledge base as much as possible, the fragmented event knowledge instances need to merger, thus forming a more complete knowledge instance with more detailed information.

Figure 2:
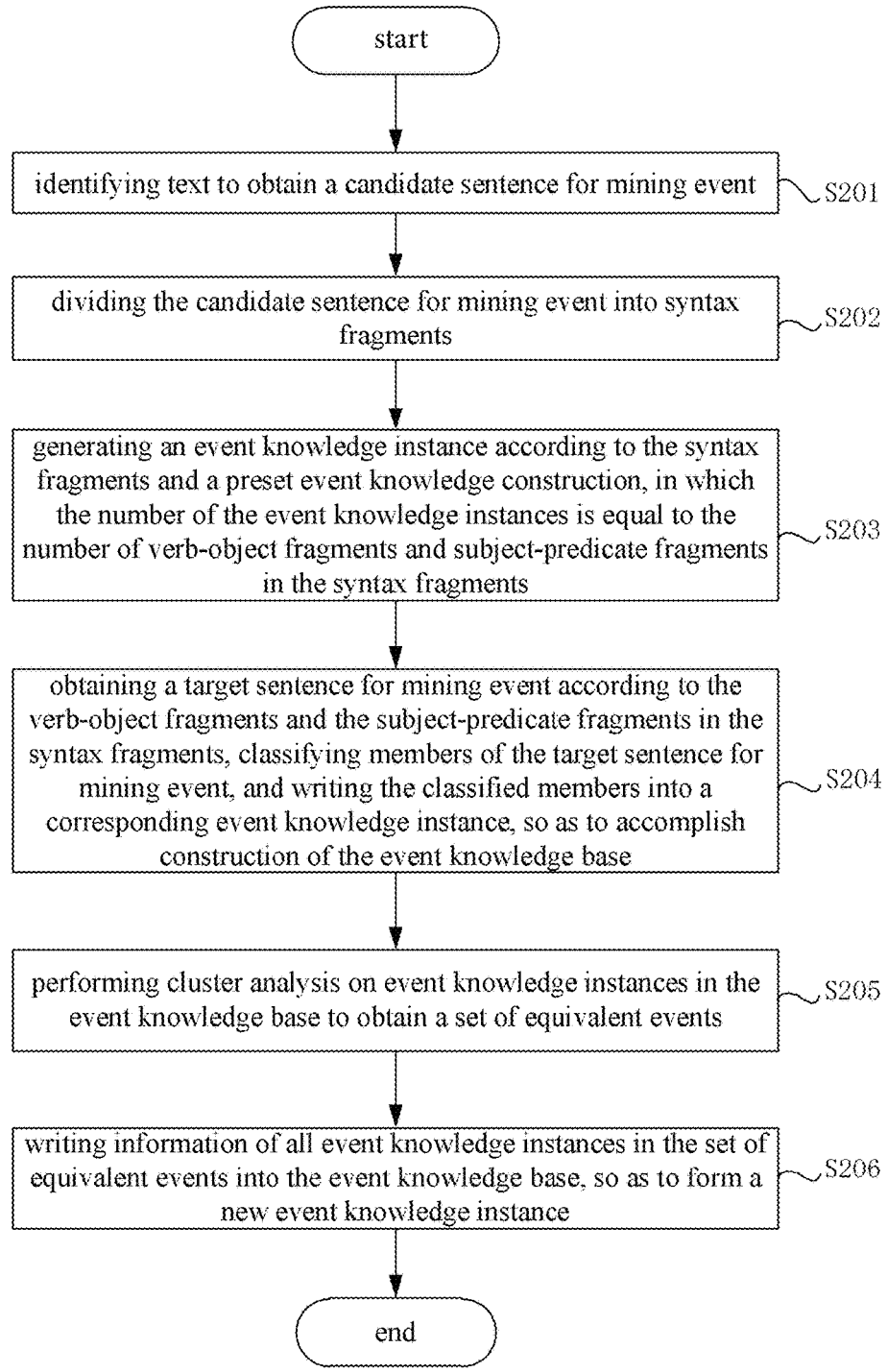
FIG. 2 is a flow chart showing a method for constructing an event knowledge base according to another embodiment of the present disclosure.

Therefore, as shown in FIG. 2, after step S104, the method further includes the following steps.

In S105, cluster analysis is performed on event knowledge instances in the event knowledge base to obtain a set of equivalent events.

Step S105 may specifically include that: the cluster analysis is performed on all event knowledge instances with consistent subject entity, consistent subject entity and consistent constraint information of the action in the event knowledge base, so as to obtain first equivalent events, the core action of the first equivalent events is extracted to generate an equivalent action dictionary; and the cluster analysis is performed on all event knowledge instances with the subject entity being consistent with the subject entity to obtain second equivalent events, and all event knowledge instances with consistent core action are selected from the second equivalent events according to the equivalent action dictionary to generate the set of equivalent events.

In S106, information of all event knowledge instances in the set of equivalent events is written into the event knowledge base, so as to form a new event knowledge instance.

The merging procedure on three event knowledge instances in Table 6 is as follows:

First, the cluster analysis is performed on all event knowledge instances of the subject entity of the initiator and the subject entity of the bearer and with no conflicting constraint information, and all event knowledge instances with the same category are regarded as "equivalent events", and the core actions of the equivalent events may be extracted to form the equivalent action dictionary which refers to "acquiring, merging and being acquired" in this embodiment. Then, the cluster analysis is performed again on all event knowledge instances with the subject entity of the promoter being consistent with the subject entity of the bearer, and all event knowledge instances with the equivalent core action may be selected from the cluster according to the equivalent action dictionary to form the set of equivalent events, in which the event knowledge instances in the set of equivalent events are event_1, event_2 and event_3. Then, a random event knowledge instance is selected from the set of equivalent events as the core event EV, and all constraints and the subject entity embellishment attributes in other events are merged into EV, so as to form the final merged event knowledge instance which is added into the event knowledge base and is allocated the unique event ID by the event knowledge base. By the above merging procedure, event_1, event_2 and event_3 are merged into a new event knowledge instance event_4, as shown in Table 7.

TABLE 7 the event knowledge base after merging

| attribute type | attribute | value |
|---|---|---|
| ID | event ID | event_4 |
| subject entity | entity | BAIDU Co. (company_XXX) |
| | embellishment 1 | Chinese search engine giant |
| | embellishment 2 | search engine giant |
| object entity | entity | 91 Wireless (company_YYY) |
| | embellishment 1 | the subsidiary of Network Dragon Co. |
| | embellishment 2 | wireless distribution platform |
| action | core action | Acquire, merger |
| | constraint 1 | (time) July 2013 |
| | constraint 2 | (price) 1.9 billion (USD) |
| | constraint 3 | (means) by shares |

The above method for constructing an event knowledge base may construct the event knowledge base according to the preset event knowledge construction and the syntax fragments, and structuralize the webpage knowledge based on the event knowledge base and further support the inference and calculation between knowledge. In addition, the method may merge the related events, thus providing the accurate research results for the user when the user conducts the in-depth knowledge search and further improving the user's search experience.

Figure 3:
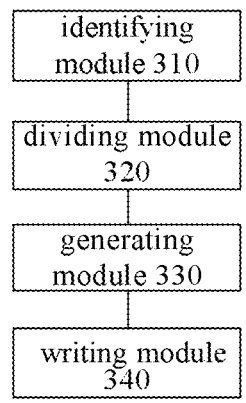
FIG. 3 is a block diagram showing a device for constructing an event knowledge base according to an embodiment of the present disclosure.

FIG. 3 is a block diagram showing a device for constructing an event knowledge base according to an embodiment of the present disclosure.

As shown in FIG. 3, the device includes an identifying module 310, a dividing module 320, a generating module 330 and a writing module 340.

The identifying module 310 is configured to identify text to obtain an event mining candidate sentence; the dividing module 320 is configured to divide the event mining candidate sentence identified by the identifying module into syntax fragments; the generating module 330 is configured to generate an event knowledge instance according to the syntax fragments obtained by the dividing module and a preset event knowledge construction, in which the number of the event knowledge instances is equal to the number of verb-object fragments and subject-predicate fragments in the syntax fragments; and the wiring module 340 is configured to obtain an event mining target sentence according to the verb-object fragments and the subject-predicate fragments in the syntax fragments, to divide the event mining target sentence, and to write divided members into an event knowledge instance correspondingly, so as to accomplish construction of the event knowledge base.

In an embodiment of the present disclosure, the preset event knowledge construction has four attributes: an identifier of event knowledge instance, a subject entity, an object entity and an action; the subject entity includes entity information and embellishment information corresponding to an action initiator; the object entity includes entity information and embellishment information corresponding to an action bearer; the action includes a core action and constraint information, in which:

(a) The identifier of event knowledge instance is the unique independent identifier of event knowledge instance, mainly allocated by the event knowledge base and stored in event ID attribute. A single event knowledge instance has one and only one ID.

(b) The subject entity identifies the action initiator of the event (the subject in the passive sentence also is the action initiator); its entity attribute domain stores the entity name and the entity semantic ID and its modification attribute domain (one entity may include multiple modification attributes) stores the modifier and determiner of the entity; in the single event knowledge, one subject entity attribute is needed at least; the subject entity may be plural; certainly, the information stored in the above modification attribute domain is the embellishment information.

(c) The object entity identifies the action bearer of the event; its entity attribute domain stores the entity name and the entity semantic ID; in addition to the entity words, quantifier (e.g., 10.39% of shares), time (date, hour/minute/second), a period of time (e.g., XX day to YY day, AA hour to BB hour), resource (e.g., url, uri, etc.), telephone/postcode, location/direction (e.g., dining hall, the south), tool/material (e.g., wool, wages), comparison (e.g., one to two), means (e.g., surgery, low pitch), enumeration word (e.g., constellations, blood types), common noun (e.g., mobile application distribution platform), etc. may also serve as the object entity; its modification attribute domain stores the modifier and determiner of the object entity; in the single event knowledge, the subject entity may be missing, for example, Jobs' death; certainly, the information stored in the above modification attribute domain being the embellishment information.

(d) Action identifies the behavior of the subject entity in the event; "the core action" identifies the behavior of the subject entity and the single event knowledge has one and only one core action attribute (parallel actions may exist, for example, "develop and operate"); the constraint attribute is configured to embellish the core action and there may be two or more constraint attributes; the constraint attribute may be identified with the specific attribute type (e.g., time, price, status, direction, etc.) and the type (e.g., quantifier type, entity type) may be assigned for the attribute value of the constraint attribute.

After the writing module 340 obtains the event mining target sentences, the mining may be performed around the verb. That is, the subject-predicate fragments and the verb-object fragments in the event mining target sentences may be divided firstly, and then other fragments may be divided.

Specifically, the writing module 340 is specifically configured to: divide the subject-predicate fragment in the event mining target sentence, and write all divided members into the subject entity, the object entity and the action of the event knowledge sentence; write the subject fragment into the subject entity of the event knowledge sentence, divide the verb-object fragment and write all divided members into the object entity and the action of the event knowledge sentence, if the subject fragment exists in the verb-object fragment in the event mining target sentence; and divide syntax fragments in the event mining target sentence except the subject-predicate fragment and the verb-object fragment, and write all divided members into the embellishment information and the constraint information of the event knowledge sentence, in which the members includes one or more of a subject, a predicate, an object, a subject attributive, an adverbial and an object attributive.

Figure 4:
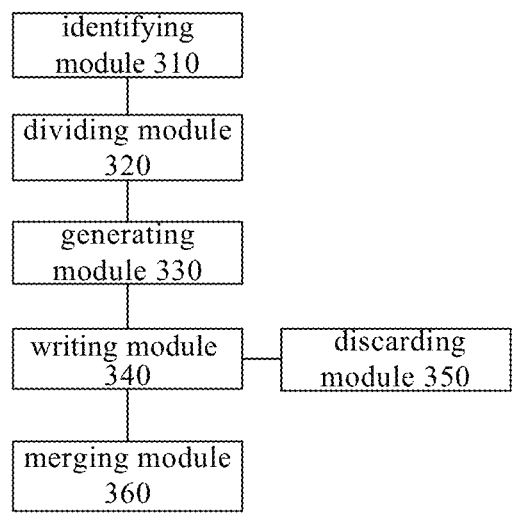
FIG. 4 is a block diagram showing a device for constructing an event knowledge base according to another embodiment of the present disclosure.

In addition, the device may further include a discarding module 350. As shown in FIG. 4, the discarding module 350 is configured to discard the verb-object fragment, if the subject fragment does not exist in the verb-object fragment in the event mining target sentence.

The working procedure of the device containing the identifying module 310, the dividing module 320, the generating module 330, the wiring module 340 and the discarding module 350 may be referred to FIG. 1, which will not be elaborated herein.

Further, the device also includes a merging module 360. The merging module 360 is configured to perform cluster analysis on event knowledge instances in the event knowledge base to obtain a set of equivalent events after the writing module 340 writes the divided members into the corresponding event knowledge instance, and configured to write information of all event knowledge instances in the set of equivalent events into the event knowledge base, so as to form a new event knowledge instance.

Specifically, the merging module 360 is configured to: perform the cluster analysis on all event knowledge instances with consistent subject entity, consistent subject entity and consistent constraint information of the action in the event knowledge base, so as to obtain first equivalent events, and extract the core actions in the first equivalent events to generate an equivalent action dictionary; and perform the cluster analysis on all event knowledge instances with the subject entity being consistent with the subject entity, so as to obtain second equivalent events, and select all event knowledge instances with consistent core action from the second equivalent events according to the equivalent action dictionary to generate the set of equivalent events.

The working procedure of the device containing the identifying module 310, the dividing module 320, the generating module 330, the wiring module 340, the discarding module 350 and the merging module 360 may be referred to FIG. 2, which will not be elaborated herein.

The above device for constructing an event knowledge base may construct the event knowledge base according to the preset event knowledge construction and the syntax fragments, and structuralize the webpage knowledge based on the event knowledge base and further support the inference and calculation between knowledge. In addition, the method may merge the related events, thus providing the accurate research results for the user when the user conducts the in-depth knowledge search and further improving the user's search experience.

In order to realize the above embodiments, the present disclosure also provides a non-transitory computer-readable storage medium having stored therein instructions that, when executed by a processor of an electronic device, causes the electronic device to perform the method for constructing an event knowledge base, the method according to any one of embodiments.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for constructing an event knowledge base for use in a web search engine, comprising:
    identifying, with one or more processors, text to obtain an event mining candidate sentence;
    dividing, with the one or more processors, the event mining candidate sentence into syntax fragments;
    generating, with the one or more processors, an event knowledge instance according to the syntax fragments and a preset event knowledge construction, wherein the number of the event knowledge instances is equal to the number of verb-object fragments and subject-predicate fragments in the syntax fragments;
    obtaining, with the one or more processors, an event mining target sentence according to the verb-object fragments and the subject-predicate fragments in the syntax fragments, dividing the event mining target sentence, and writing divided members into an event knowledge instance correspondingly, so as to accomplish construction of the event knowledge base;
    receiving, with the one or more processors, an internet search query from a user;
    obtaining, with the one or more processors, search results based upon the event knowledge base;
    sending, with the one or more processors, the search results to the user to be displayed.

2. The method according to claim 1, wherein the syntax fragments comprises one or more of a verb-object fragment, a subject-predicate fragment, an adverbial fragment, a subject fragment and a nounal predicate fragment.

3. The method according to claim 1, wherein the preset event knowledge construction has four attributes: an identifier of event knowledge instance, a subject entity, an object entity and a motion; the subject entity comprises entity information and embellishment information corresponding to an action initiator; the object entity comprises entity information and embellishment information corresponding to an action bearer; the action comprises a core action and constraint information.

4. The method according to claim 3, wherein dividing the event mining target sentence and writing divided members into the event knowledge instance correspondingly comprises:
    dividing the subject-predicate fragment in the event mining target sentence, and writing all divided members into the subject entity, the object entity and the action of the event knowledge sentence;
    writing the subject fragment into the subject entity of the event knowledge sentence, dividing the verb-object fragment and writing all divided members into the subject entity and the action of the event knowledge sentence, if the subject fragment exists in the verb-object fragment in the event mining target sentence; and
    dividing syntax fragments in the event mining target sentence except the subject-predicate fragment and the verb-object fragment, and writing all divided members into the embellishment information and the constraint information of the event knowledge sentence, wherein the members comprises one or more of a subject, a predicate, an object, a subject attributive, an adverbial and an object attributive.

5. The method according to claim 4, further comprising:
    discarding the verb-object fragment, if the subject fragment does not exist in the verb-object fragment in the event mining target sentence.

6. The method according to claim 5, after writing divided members into the event knowledge instance correspondingly, further comprising:
    performing cluster analysis on event knowledge instances in the event knowledge base to obtain a set of equivalent events;
    writing information of all event knowledge instances in the set of equivalent events into the event knowledge base, so as to form a new event knowledge instance.

7. The method according to claim 6, wherein performing cluster analysis on event knowledge instances in the event knowledge base to obtain a set of equivalent events comprises:
    performing the cluster analysis on all event knowledge instances with consistent subject entity, consistent subject entity and consistent constraint information of the action in the event knowledge base, so as to obtain first equivalent events, extracting the core action of the first equivalent events to generate an equivalent action dictionary; and
    performing the cluster analysis on all event knowledge instances with the subject entity being consistent with the subject entity to obtain second equivalent events, and selecting all event knowledge instances with consistent core action from the second equivalent events according to the equivalent action dictionary to generate the set of equivalent events.

8. A device for constructing an event knowledge base for use in a web search engine, comprising:
    a processor;
    a memory configured to store an instruction executable by the processor;
    wherein the processor is configured to:
    identify text to obtain an event mining candidate sentence;

divide the event mining candidate sentence identified by the identifying module into syntax fragments;

generate an event knowledge instance according to the syntax fragments and a preset event knowledge construction, wherein the number of the event knowledge instances is equal to the number of verb-object fragments and subject-predicate fragments in the syntax fragments; and obtain an event mining target sentence according to the verb-object fragments and the subject-predicate fragments in the syntax fragments, divide the event mining target sentence, and write divided members into an event knowledge instance correspondingly, so as to accomplish construction of the event knowledge base;

receive an internet search query from a user;

obtain search results based upon the event knowledge base;

send the search results to the user to be displayed.

9. The device according to claim 8, wherein the syntax fragments comprises one or more of a verb-object fragment, a subject-predicate fragment, an adverbial fragment, a subject fragment and a nounal predicate fragment.

10. The device according to claim 8, wherein the preset event knowledge construction has four attributes: an identifier of event knowledge instance, a subject entity, an object entity and an action; the subject entity comprises entity information and embellishment information corresponding to an action initiator; the object entity comprises entity information and embellishment information corresponding to an action bearer; the action comprises a core action and constraint information.

11. The device according to claim 10, wherein the processor is specifically configured to:

divide the subject-predicate fragment in the event mining target sentence, and write all divided members into the subject entity, the object entity and the action of the event knowledge sentence;

write the subject fragment into the subject entity of the event knowledge sentence, divide the verb-object fragment and write all divided members into the subject entity and the action of the event knowledge sentence, if the subject fragment exists in the verb-object fragment in the event mining target sentence; and divide syntax fragments in the event mining target sentence except the subject-predicate fragment and the verb-object fragment, and write all divided members into the embellishment information and the constraint information of the event knowledge sentence, wherein the members comprises one or more of a subject, a predicate, an object, a subject attributive, an adverbial and an object attributive.

12. The device according to claim 11, wherein the processor is configured to:

discard the verb-object fragment, if the subject fragment does not exist in the verb-object fragment in the event mining target sentence.

13. The device according to claim 1, wherein the processor is configured to:

perform cluster analysis on event knowledge instances in the event knowledge base to obtain a set of equivalent events after writing the divided members into the event knowledge instance correspondingly, and write information of all event knowledge instances in the set of equivalent events into the event knowledge base, so as to form a new event knowledge instance.

14. The device according to claim 13, wherein the processor is specifically configured to:

perform the cluster analysis on all event knowledge instances with consistent subject entity, consistent subject entity and consistent constraint information of the action in the event knowledge base, so as to obtain first equivalent events, extract the core actions in the first equivalent events to generate an equivalent action dictionary; and perform the cluster analysis on all event knowledge instances with the subject entity being consistent with the subject entity, so as to obtain second equivalent events, and selecting all event knowledge instances with consistent core action from the second equivalent events according to the equivalent action dictionary to generate the set of equivalent events.

15. A non-transitory computer-readable storage medium having stored therein instructions that, when executed by a processor of an electronic device, causes the electronic device to perform a method for constructing an event knowledge base for use in a web search engine, the method comprising:

identifying, with one or more processors, text to obtain an event mining candidate sentence;

dividing, with the one or more processors, the event mining candidate sentence into syntax fragments;

generating, with the one or more processors, an event knowledge instance according to the syntax fragments and a preset event knowledge construction, wherein the number of the event knowledge instances is equal to the number of verb-object fragments and subject-predicate fragments in the syntax fragments;

obtaining, with the one or more processors, an event mining target sentence according to the verb-object fragments and the subject-predicate fragments in the syntax fragments, dividing the event mining target sentence, and writing divided members into an event knowledge instance correspondingly, so as to accomplish construction of the event knowledge base;

receiving, with the one or more processors, an internet search query from a user;

obtaining, with the one or more processors, search results based upon the event knowledge base;

sending, with the one or more processors, the search results to the user to be displayed.

* * * * *